United States Patent
Katsura et al.

(10) Patent No.: US 8,089,876 B2
(45) Date of Patent: Jan. 3, 2012

(54) PACKET TRANSMISSION APPARATUS AND PACKET TRANSMISSION METHOD

(75) Inventors: Yuichiro Katsura, Fukuoka (JP); Koji Hachiya, Fukuoka (JP); Tetsuo Ehara, Fukuoka (JP); Yasuyuki Mitsumori, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 217 days.

(21) Appl. No.: 12/554,214

(22) Filed: Sep. 4, 2009

(65) Prior Publication Data

US 2010/0061267 A1    Mar. 11, 2010

(30) Foreign Application Priority Data

Sep. 8, 2008    (JP) ................. 2008-230235

(51) Int. Cl.
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. .............. 370/230.1; 370/232; 370/236.2; 370/241.1

(58) Field of Classification Search ............. 370/230.1, 370/232, 236.2, 241.1
See application file for complete search history.

(56) References Cited

U.S. PATENT DOCUMENTS

| | | | |
|---|---|---|---|
| 6,735,219 B1 * | 5/2004 | Clauberg | 370/474 |
| 7,027,394 B2 * | 4/2006 | Gupta et al. | 370/230.1 |
| 7,042,848 B2 * | 5/2006 | Santiago et al. | 370/253 |
| 7,236,458 B2 * | 6/2007 | Lee et al. | 370/230 |
| 7,327,688 B2 * | 2/2008 | Burwell et al. | 370/242 |
| 7,349,338 B2 * | 3/2008 | Balachandran et al. | 370/232 |
| 7,688,727 B1 * | 3/2010 | Ferguson et al. | 370/230.1 |
| 2004/0131064 A1 * | 7/2004 | Burwell et al. | 370/397 |
| 2005/0083845 A1 * | 4/2005 | Compton et al. | 370/235 |
| 2007/0177504 A1 | 8/2007 | Iwata et al. | |
| 2010/0061267 A1 * | 3/2010 | Katsura et al. | 370/253 |

FOREIGN PATENT DOCUMENTS

| | | |
|---|---|---|
| JP | 5-284172 | 10/1993 |
| JP | 6-37790 | 2/1994 |
| JP | 2007-509577 | 4/2007 |
| JP | 2007-208518 | 8/2007 |
| WO | 2005/043931 A2 | 5/2005 |

OTHER PUBLICATIONS

English translation of Japanese Office Action dated Jul. 27, 2010 issued in corresponding Japanese Patent Application 2008-230235.

* cited by examiner

*Primary Examiner* — Aung S Moe
*Assistant Examiner* — Benjamin H Elliott, IV
(74) *Attorney, Agent, or Firm* — Staas & Halsey LLP

(57) ABSTRACT

An aspect of the embodiments related to a packet transmission apparatus includes a user identification unit for identifying the user of an input user flow upon input of the user flow containing communication packets and maintenance packets, a maintenance packet extraction unit for extracting the maintenance packets from the user flow of the user identified by the user identification unit, a maintenance packet output control unit for controlling the transparent output of the maintenance packets extracted by the maintenance packet extraction unit based on the monitor rate setting, and a control unit for monitoring and controlling the user flow of the particular user based on the maintenance packets of the user transparently output by the maintenance packet output control unit.

16 Claims, 11 Drawing Sheets

| USER | OAM TYPE | USER OAM TYPE PID |
|---|---|---|
| USER #A | CC | 10 |
| | LB | 11 |
| | LT | 12 |
| USER #B | CC | 20 |
| | LB | 21 |
| | LT | 22 |
| USER #C | CC | 30 |
| | LB | 31 |
| | LT | 32 |
| USER #D | CC | 30 |
| | LB | 31 |
| | LT | 32 |
| USER #E | CC | 0 |
| | LB | 0 |
| | LT | 0 |
| USER #F | CC | 50 |
| | LB | 51 |
| | LT | 52 |
| USER #G | CC | 60 |
| | LB | 61 |
| | LT | 62 |

PACKET TRANSMISSION APPARATUS AND PACKET TRANSMISSION METHOD

CROSS-REFERENCE TO RELATED APPLICATIONS

This application is based upon and claims the benefit of priority of Japanese Patent Application No. 2008-230235 filed on Sep. 8, 2008, the entire contents of which are incorporated herein by reference.

FIELD

The embodiments relate to a packet transmission apparatus and a packet transmission method.

BACKGROUND

In recent years, the remote WAN (Wide Area Network) service has come to use LAN (Local Area Network) techniques such as Ethernet (registered trademark). In the WAN service, however, the maintenance and operation of the WAN functions are not sufficient.

In view of this, the telecommunication common carriers often carry out maintenance and operations using the TCP/IP management protocol SNMP (Simple Network Management Protocol).

With SNMP, however, the states up to layer 2 cannot be judged, and in order to secure a high reliability of maintenance and operation, the capability of judgment up to the state of layer 2 is desired.

Under the circumstances, the OAM is being standardized as Y.1731 of ITU (International Telecommunication Union)-T or IEEE802.1ag of IEEE (Institute of Electrical and Electronic Engineers).

The OAM is a protocol technique used for maintenance and operation of a network device, and by use of this protocol technique, a fault which may occur may be automatically detected and the place of the fault may be analyzed.

In the packet transmission apparatus employing the OAM to transmit and receive user flows containing the OAM packets and the communication packets, policing is carried out, upon receipt of the user flow, based on the user flow monitor rate regardless of whether the packets are communication packets or OAM packets.

Policing is equivalent to a rate limiting function which controls the transparent output of a user flow containing communication packets and OAM packets based on the monitor rate setting.

In the packet transmission apparatus, assume that policing is carried out on the user flow. When the user flow transmission rate exceeds the monitor rate, the packets in the particular user flow are discarded. When the user flow transmission rate has yet to exceed the monitor rate, on the other hand, the packets in the particular user flow are transparently output.

Also, in the packet transmission apparatus, the communication packets and the OAM packets are extracted from the user flow after policing, and the OAM packets are transmitted to a CPU through a buffer.

SUMMARY

According to an aspect of an embodiment, a packet transmission apparatus includes a user identification unit for identifying the user of an input user flow upon input of the user flow containing communication packets and maintenance packets, a maintenance packet extraction unit for extracting the maintenance packets from the user flow of the user identified by the user identification unit, a maintenance packet output control unit for controlling the transparent output of the maintenance packets extracted by the maintenance packet extraction unit based on the monitor rate setting, and a control unit for monitoring and controlling the user flow of the particular user based on the maintenance packets of the user transparently output by the maintenance packet output control unit.

Other aspects and advantages of the embodiments of the invention discussed herein will be realized and attained by referring to the elements and combinations particularly described with reference to the accompanying drawings, wherein like numerals refer to like parts throughout, and forming a part hereof, and as pointed out in the claims.

It is to be understood that both the foregoing general description and the following detailed and the following detailed description are exemplary and are not restrictive of the invention, as claimed.

DESCRIPTION OF EMBODIMENT

Figure 1:
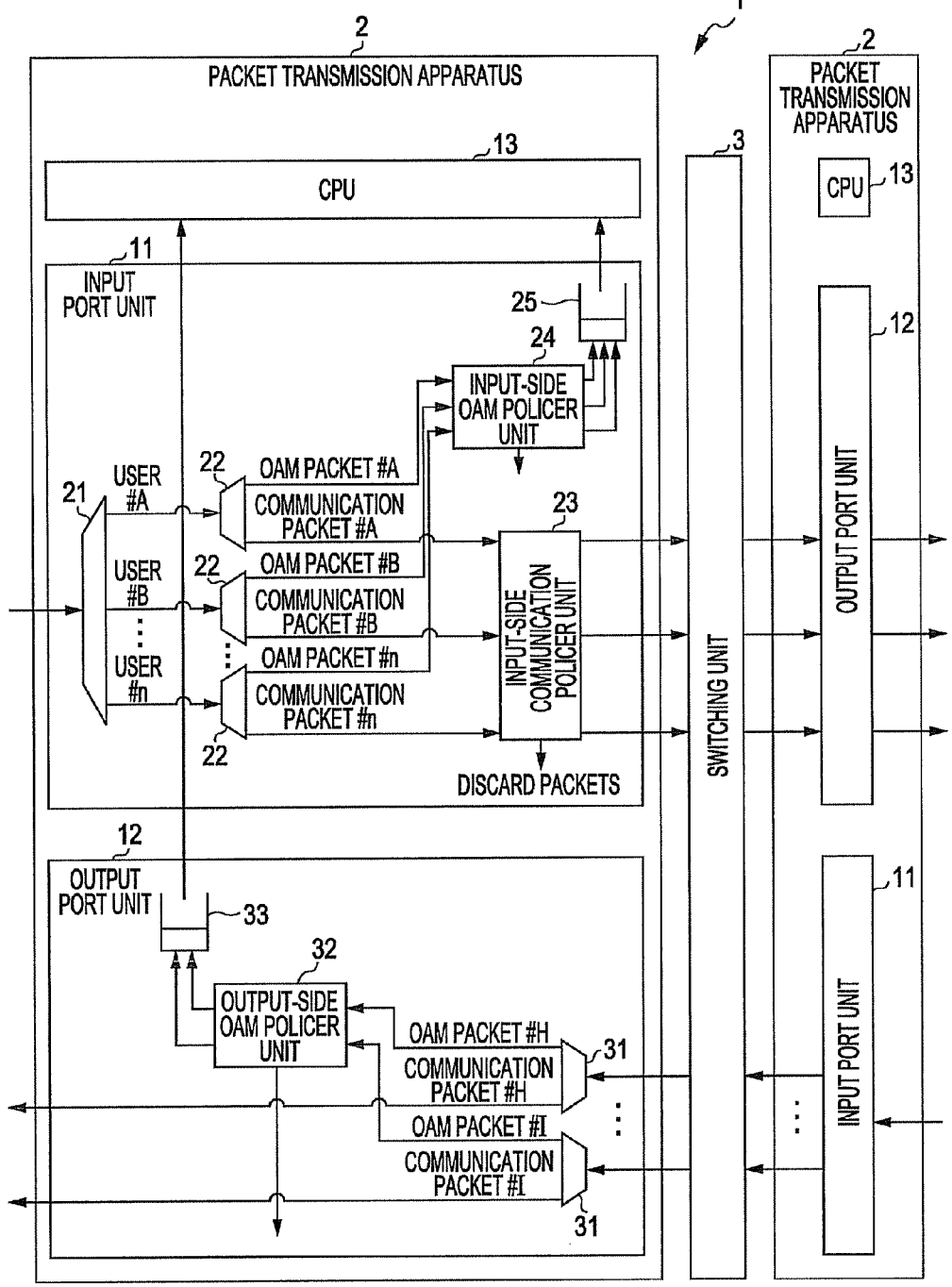
FIG. 1 is a block diagram illustrating the configuration of a packet transmission system according to a first embodiment.

In the packet transmission apparatus disclosed above, the extracted OAM packets are sequentially stored in a buffer, and the OAM packets thus stored in the buffer are sequentially output to a CPU at a transmission rate tolerable to the CPU. The CPU, therefore, may monitor and control the maintenance and operation of the user flow communication based on the OAM packets acquired.

In the packet transmission apparatus described in BACKGROUND OF THE INVENTION section above, the policing is carried out on the user flow containing the communication packets and the OAM packets, and the effect of the policing extends to the concerned communication packets. In the present situation, however, substantially no policing effect extends to the OAM packets which are smaller than the communication packets.

Also, the packet processing ability of the CPU is very low compared to the transmission rate of the packets provided as a relay function. On a line of 10 Gbps, for example, the CPU has a processing ability of only about several hundred Mbps. Thus, the burden on the CPU is large.

With the packet transmission apparatus disclosed above, in spite of the fact that the policing effect on the OAM packets is substantially zero and the packet processing ability of the CPU is very low, the OAM packets, which may be input at an abnormally high rate beyond estimation and may even be from a malicious user such as in a DoS attack, are similarly transmitted to the CPU sequentially through the buffer. The CPU, having received a vast amount of OAM packets or at an abnormal high rate, however, is liable to hang up, or the CPU's processing ability may be remarkably reduced as a whole.

Also, the packet transmission apparatus disclosed above, which sequentially transmits the OAM packets to the CPU in a vast amount or at an abnormally high rate through the buffer, may cause an overflow of the buffer, with the result that the OAM packets of other users stored in the buffer may also be discarded without permission, thereby adversely affecting the other users.

Further, in the packet transmission apparatus disclosed above, once the OAM packets in the buffer are discarded without permission due to the overflow, the CPU can no longer acquire OAM packets. In spite of the fact that the current route of the user flow communication is not yet disconnected, the current OAM route of the user flow communication would be judged as disconnected, resulting in an unnecessary line switching operation.

In order to prevent the OAM packets of other users from being discarded without permission, the packet transmission apparatus disclosed above may include a buffer for each user flow to remove the effect of the abnormal rate of the OAM packets between users. The provision of a buffer for each user flow, however, may greatly increase the capacity of the memory making up the queue for accommodating a great number of users, resulting in a very bulky apparatus.

Embodiments for carrying out the invention are explained in detail below.

According to a first embodiment of the invention, there is provided a packet transmission apparatus including a user identification unit for identifying a user of an input user flow containing communication packets and OAM packets, and a CPU for maintaining and controlling the user flow of the user based on the OAM packets of the user identified by the user identification unit, wherein the transparent output of the OAM packets extracted from the user flow to the CPU is controlled based on the monitor rate setting. For example, the control of the transparent output is conducted by policing the OAM packets extracted.

In the packet transmission apparatus according to this embodiment, therefore, even when the OAM packets are received at an abnormally high rate or in a vast amount, the adverse effect on other users, which might be caused by the discard of the OAM packets, may be reduced if not prevented without imposing any burden on the buffer in the front stage of the CPU or on the CPU.

FIG. 1 is a block diagram illustrating the configuration of the packet transmission system according to the first embodiment.

The packet transmission system in FIG. 1 includes a plurality of packet transmission apparatuses 2 for transmitting and receiving a user flow containing communication packets and OAM packets, and a switching unit 3 for switching and connecting the plurality of the packet transmission apparatuses 2.

The packet transmission apparatus 2 includes an input port unit 11 and an output port unit 12 for transmitting and receiving the user flow, and a CPU 13 for controlling the input port unit 11 and the output port unit 12.

The input port unit 11, includes a first flow identification unit 21 for identifying a user of the received user flow, and a plurality of second flow identification units 22 for separating and extracting the communication packets and the OAM packets in the user flow for each user identified by the first flow identification unit 21.

Also, the input port unit 11 includes an input-side communication policer unit 23 for controlling by policing the communication packets separated and extracted by the second flow identification unit 22, and an input-side OAM policer unit 24 for controlling by policing only the OAM packets separated and extracted by the second flow identification unit 22.

In the input-side communication policer unit 23, the communication packets for each user, which are separated and extracted by the second flow identification unit 22, are controlled by policing according to the dual token bucket scheme.

In the input-side OAM policer unit 24, the OAM packets for each user, which are separated and extracted by the second flow identification unit 22, are controlled by policing according to the single token bucket scheme.

Also, the input port unit 11 includes an input-side buffer unit 25 for provisionally storing the OAM packets police-controlled by the input-side OAM policer unit 24 and output to the CPU 13 at the transmission rate on the CPU 13 side.

The output port unit 12 includes a third flow identification unit 31 which, upon reception of the user flow from the switching unit 3, identifies the user of the particular user flow while separating and extracting the communication packets and the OAM packets contained in the user flow.

Also, the output port unit 12 includes an output-side OAM policer unit 32 for controlling by policing only the OAM packets separated and extracted by the third flow identification unit 31, and an output-side buffer unit 33 for provisionally storing the OAM packets police-controlled by the output-side OAM policer unit 32 and for outputting the OAM packets thus stored to the CPU 13 in accordance with the transmission rate on the CPU 13 side.

In the output-side OAM policer unit 32, the OAM packets for each user, which are separated and extracted by the third flow identification unit 31, are police-controlled according to the single token bucket scheme.

The separated and extracted communication packets are transmitted to their specific addresses by the third flow identification unit 31.

Figure 2:
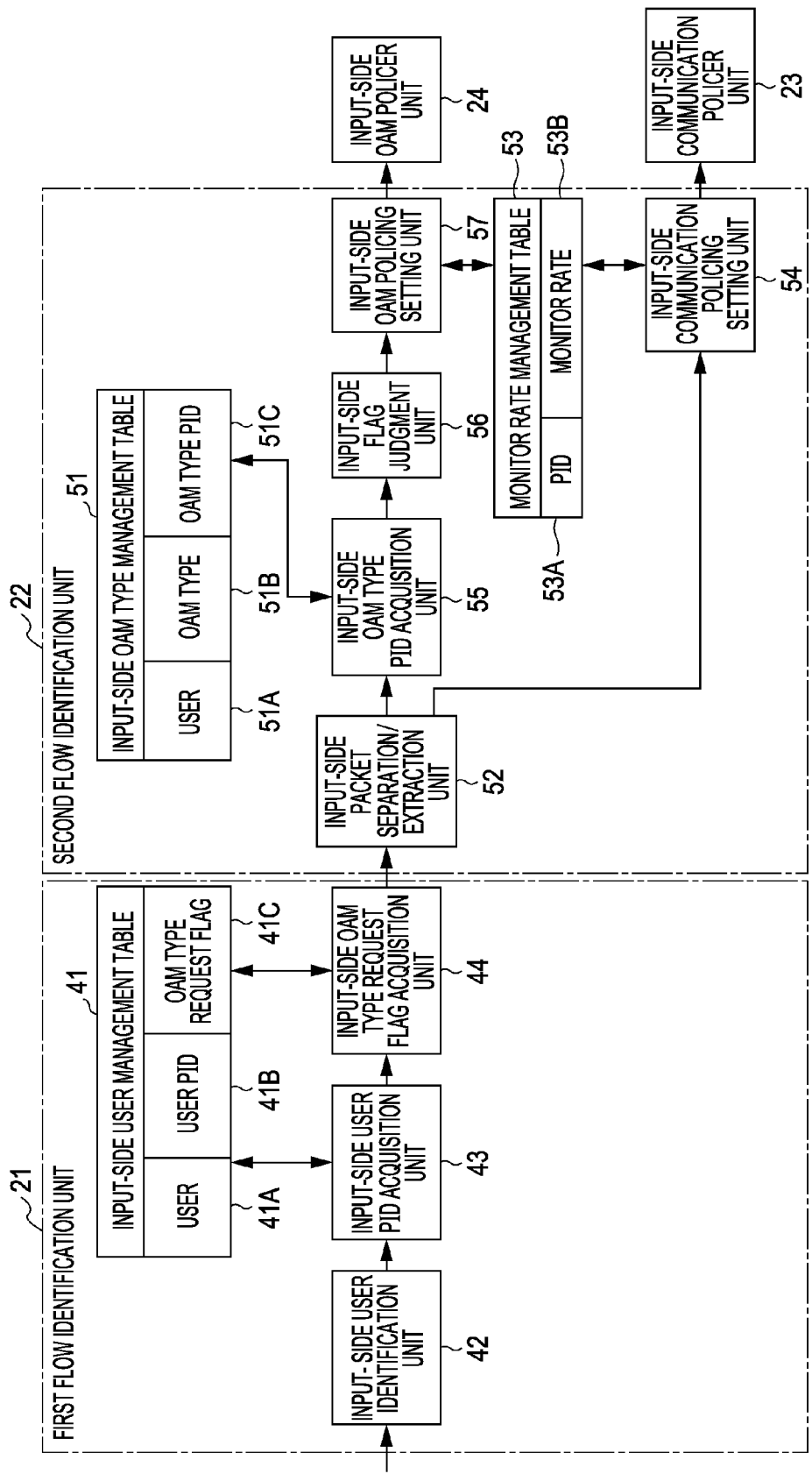
FIG. 2 is a block diagram illustrating the configuration of a first flow identification unit and a second flow identification unit in the input port unit.

FIG. 2 is a block diagram illustrating the configuration of the first flow identification unit 21 and the second flow identification unit 22 in the input port unit 11.

The first flow identification unit 21 includes an input-side user management table 41 for managing the user monitor rate identification information (hereinafter referred to simply as "user PID") 41B and an OAM type request flag 41C for each user 41A, and an input-side user identification unit 42 for identifying the user of the user flow which may be received.

The input-side user identification unit 42, upon reception of the user flow, extracts the address information of the user flow, and, based on the address information thus extracted, identifies the user of the user flow.

Also, the first flow identification unit 21 includes an input-side user-by-user PID acquisition unit 43 (hereinafter referred to as "input-side user PID acquisition unit 43") for acquiring, from the input-side user management table 41, the user PID 41B corresponding to the user 41A identified by the input-side user identification unit 42, and an input-side OAM type request flag acquisition unit 44 for acquiring, from the input-side user management table 41, the OAM type request flag 41C corresponding to the user 41A identified by the input-side user identification unit 42.

Figure 3:
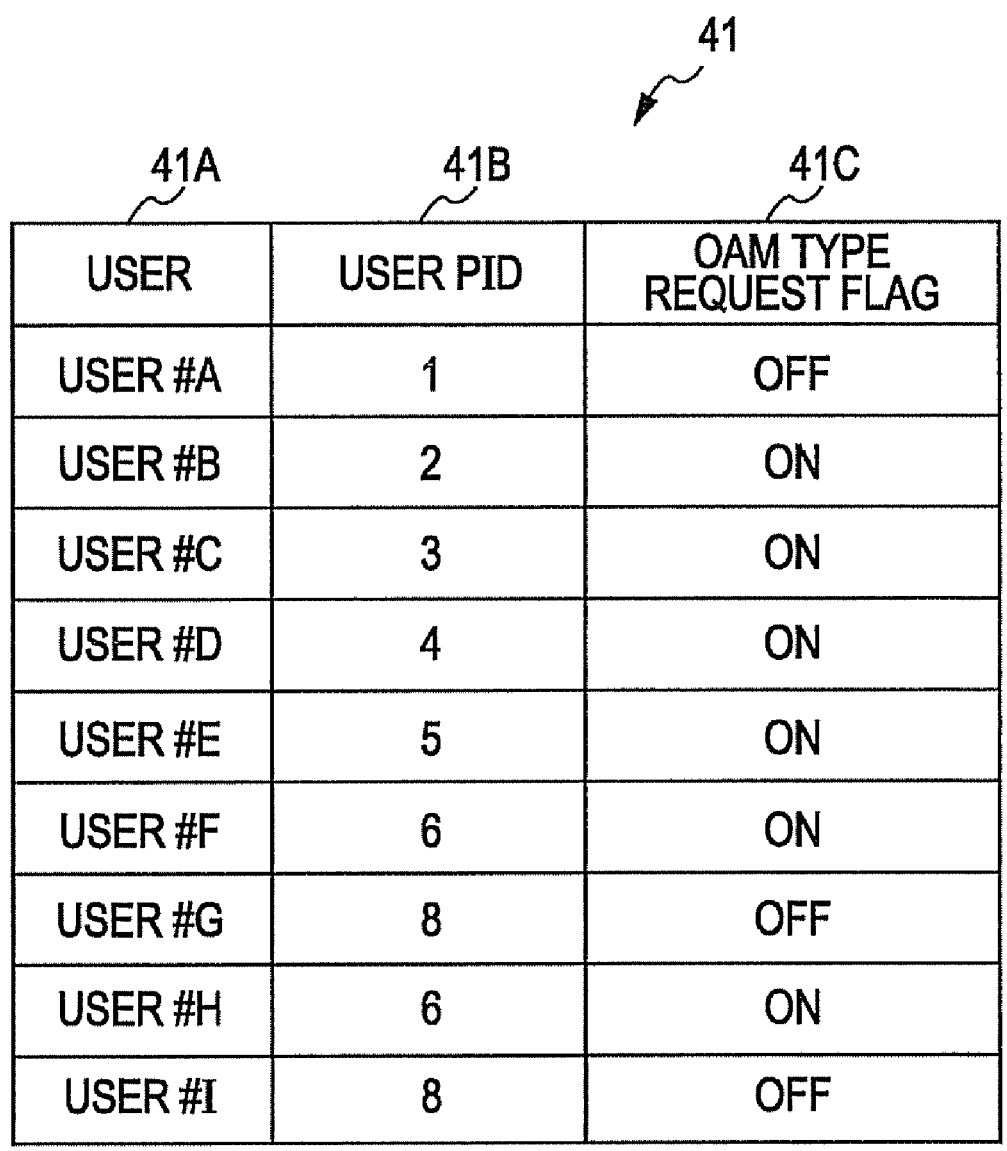
FIG. 3 is a diagram explaining the contents of an input-side user management table.

FIG. 3 is a diagram for explaining the contents of the input-side user management table 41.

The input-side user management table 41 in FIG. 3 manages the user 41A, the user PID 41B, and the OAM type request flag 41C in correspondence with each other. Thus, for example, the user PID 41B "1" and the OAM type request flag 41C "OFF" are associated with the user #A, and the user PID 41B "3" and the OAM type request flag 41C "ON" are associated with the user #C.

The maintenance operator may appropriately change the user 41A, the user PID 41B, and/or the OAM type request flag 41C in the input-side user management table 41 with an input operation.

The first flow identification unit 21, upon reception of the user flow, identifies the user of the user flow while at the same time acquiring the user PID 41B and the OAM type request flag 41C corresponding to the user 41A from the input-side user management table 41.

In the first flow identification unit 21, the additionally acquired information including the user 41A, the user PID 41B, and the OAM type request flag 41C are added to the header of the packet in the user flow, and the user flow carrying the additional information is transmitted to the second flow identification unit 22.

The second flow identification unit 22 in FIG. 2 includes an input-side OAM type management table 51 for managing an OAM type 51B and an OAM type PID 51C corresponding to each OAM type 51B of each user 51A, and an input-side packet separation/extraction unit 52 for separating and extracting the communication packets and the OAM packets upon reception of the user flow carrying the additional information from the first flow identification unit 21.

The second flow identification unit 22 also includes a monitor rate management table 53 for managing the monitor rate 53B for each PID 53A, and an input-side communication policing setting unit 54 for setting, based on the additional information of the user flow, the monitor rate on the input-side communication policer unit 23 side to police the communication packets of the user which are separated and extracted by the input-side packet separation/extraction unit 52.

The input-side communication policing setting unit 54 acquires, from the monitor rate management table 53, the monitor rate 53B for the communication packets corresponding to the user PID 41B contained in the additional information of the user flow, e.g., the user PID 41B acquired by the input-side user PID acquisition unit 43, and sets the acquired monitor rate 53B as the monitor rate of the input-side communication policer unit 23 of the communication packets.

Figure 4:
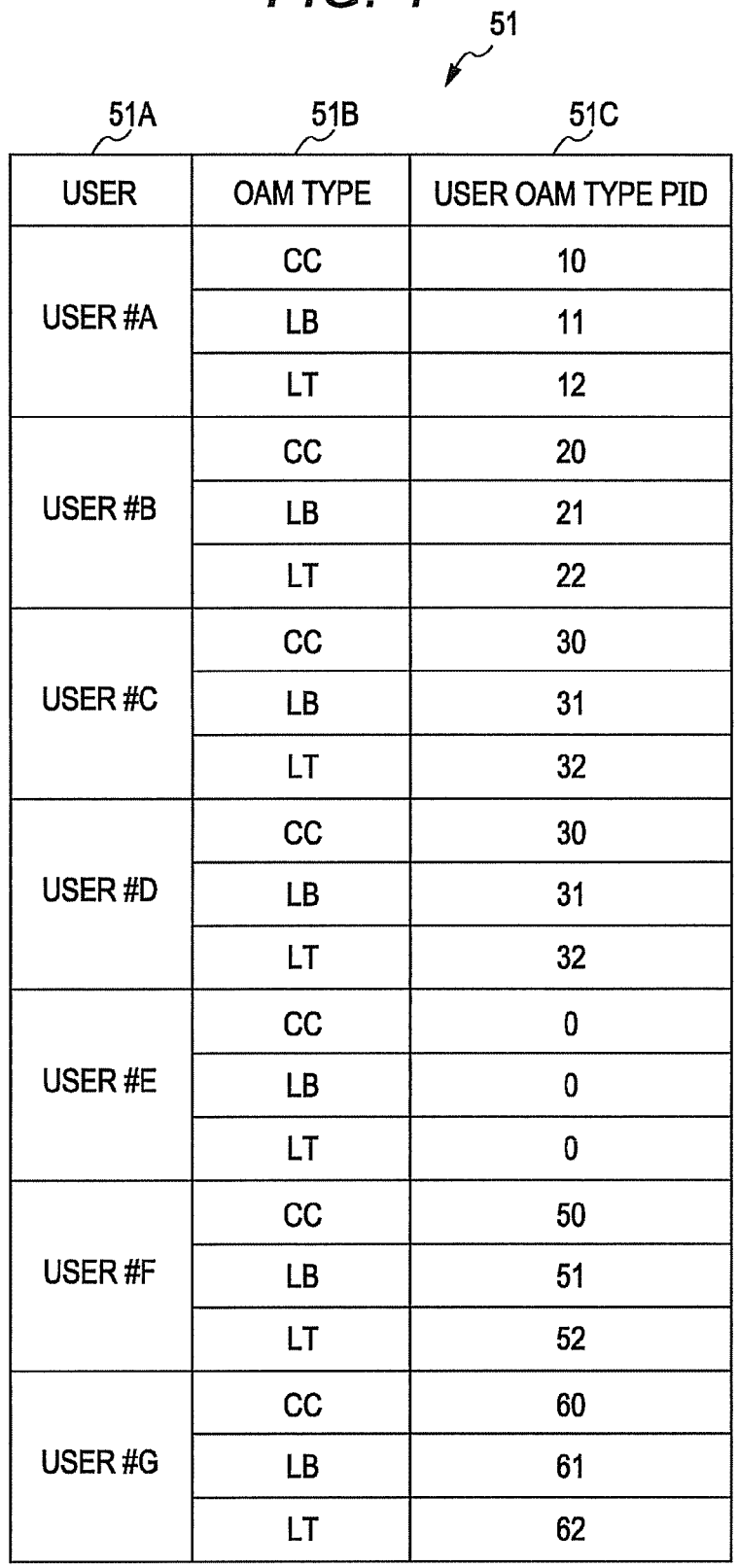
FIG. 4 is a diagram explaining the contents of an input-side OAM type management table.

FIG. 4 is a diagram for explaining the contents of the input-side OAM type management table 51.

The input-side OAM type management table 51 in FIG. 4 manages the OAM type 51B corresponding to the user 51A, and the OAM type PID 51C corresponding to each OAM type 51B. The maintenance operator may appropriately change, by an input operation, the user 51A, the OAM type 51B, and/or the OAM type PID 51C in the input-side OAM type management table 51.

Examples of the OAM type 51B include CC (Continuity Check), indicating the function of periodically confirming the connection, LB (Loop Back), indicating the function of confirming the loop response, and LT (Link Trace), indicating the function of confirming the trace response.

The input-side OAM type management table 51, with regard to the user #A, for example, manages the OAM type PID 51C corresponding to the OAM type "CC" as "10", the OAM type PID 51C corresponding to the OAM type "LB" as "11", and the OAM type PID 51C corresponding to the OAM type "LT" as "12".

A comparison between the monitor rate of the OAM type PID 51C and that of the user PID 41B indicates that the OAM type PID 51C has a monitor rate corresponding to the OAM type of the OAM packet, whereas the user PID 41B has a monitor rate corresponding to the communication packet. The monitor rate of the OAM type PID 51C, therefore, is lower than that of the user PID 41B.

The second flow identification unit 22 illustrated in FIG. 2 includes an input-side OAM type PID acquisition unit 55 for acquiring, from the input-side OAM type management table 51, the OAM type PID 51C corresponding to the OAM type of the user's OAM packet separated and extracted by the input-side packet separation/extraction unit 52 based on the additional information of the user flow.

The input-side OAM type PID acquisition unit 55, based on the additional information of the user flow, acquires the OAM type PID 51C corresponding to each OAM type 51B of the user 51A from the input-side OAM type management table 51.

The second flow identification unit 22 includes an input-side flag judgment unit 56 for judging the state of the OAM type request flag 41C containing the additional information of the user flow, and an input-side OAM policing setting unit 57 for setting the monitor rate of the input-side OAM policer unit 24 at the time of policing the OAM packets of the user which are separated and extracted by the input-side packet separation/extraction unit 52.

The input-side flag judgment unit 56 judges whether the OAM type request flag 41C contained in the additional information of the user flow is "on" or not.

When the input-side flag judgment unit 56 judges that the OAM type request flag 41C is "on", the input-side OAM policing setting unit 57 acquires, from the monitor rate management table 53, the monitor rate 53B corresponding to the OAM type PID 51C for each OAM type of the user which has been acquired by the input-side OAM type PID acquisition unit 55. The monitor rate thus acquired is set as that for the input-side OAM policer unit 24 for each OAM type of the particular user.

The input-side OAM policer unit 24, based on the monitor rate 53B for the OAM type corresponding to the OAM type PID 51C for each OAM type (CC, LB, LT) of the user, carries out the process of controlling by policing the OAM packets of the particular user for each OAM type (CC, LB, LT) according to the single token bucket scheme.

When the input-side flag judgment unit 56 judges that the OAM type flag 41C is "off", the input-side OAM policing setting unit 57 acquires, from the monitor rate management table 53, the monitor rate 53B for the communication packets corresponding to the user PID 41B contained in the additional information, e.g., the user PID 41B acquired by the input-side user PID acquisition unit 43. The monitor rate thus acquired is set as the monitor rate of the input-side OAM policer unit 24 of the OAM packets of the particular user.

The input-side OAM policer unit 24, based on the monitor rate 53B for the communication packets corresponding to the user PID 41B, executes the process of controlling by policing the OAM packets of the particular user according to the single token bucket scheme.

Figure 5:
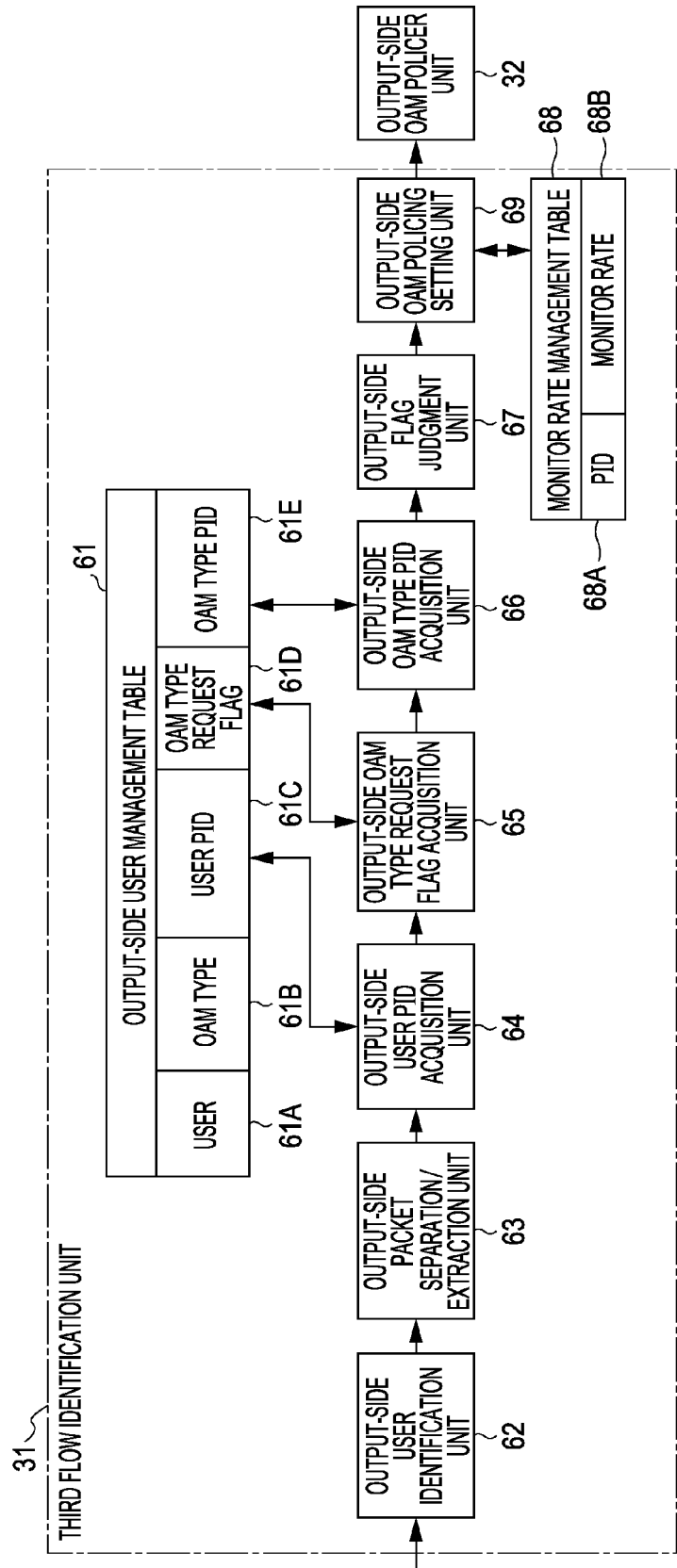
FIG. 5 is a block diagram illustrating the configuration of a third flow identification unit in the output port unit.

FIG. 5 is a block diagram of the configuration of the third flow identification unit 31 in the output port unit 12.

The third flow identification unit 31 has an output-side user management table 61 to manage the OAM type 61B, the user PID 61C, the OAM type request flag 61D, and the OAM type PID 61E for each user 61A.

Figure 6:
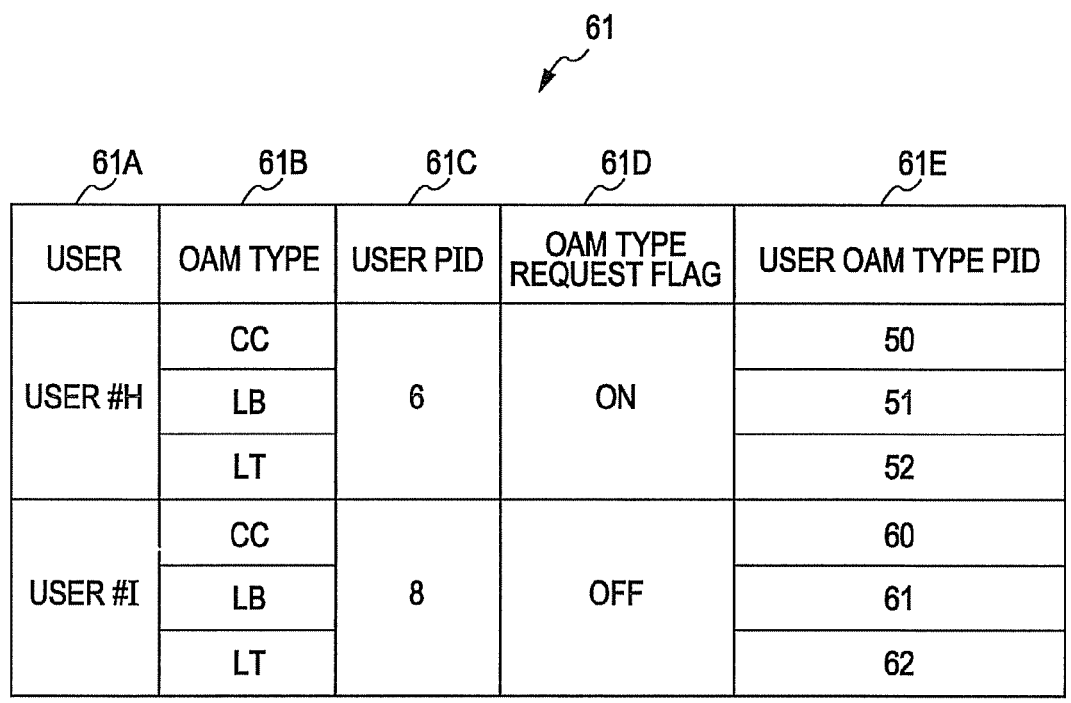
FIG. 6 is a diagram explaining the contents of an output-side user management table.

FIG. 6 is a diagram for explaining the contents of the output-side user management table 61.

The output-side user management table 61 illustrated in FIG. 6 manages the OAM type 61B, the user PID 61C, the OAM type request flag 61D, and the OAM type PID 61E in correspondence with each user 61A. With regard to the user #H, for example, the user PID 61C "6", the OAM type request flag 61D "ON", and CC "50", LB "51", and LT "52" of the OAM type PID 61E are managed in correspondence with each other. Similarly, with regard to the user #I, the user PID 61C "8", the OAM type request flag 61D "OFF", and CC "60", LB "61", and LT "62" of the OAM type PID 61E are managed in correspondence with each other.

The maintenance operator may appropriately change the user 61A, the OAM type 61B, the user PID 61C, the OAM type request flag 61D, and the OAM type PID 61E in the output-side user management table 61 with an input operation.

The third flow identification unit 31 includes an output-side user identification unit 62 for identifying the user of the user flow upon reception of the user flow, and an output-side packet separation/extraction unit 63 for separating and extracting communication packets and OAM packets upon reception of the user flow.

The output-side user identification unit 62, upon reception of the user flow, extracts the address information of the user flow and identifies the user of the user flow based on the address information thus extracted.

The third flow identification unit 31 includes an output-side user PID acquisition unit 64 for acquiring, from the output-side user management table 61, the user PID 61C corresponding to the user 61A identified by the output-side user identification unit 62.

Also, the third flow identification unit 31 includes an output-side OAM type request flag acquisition unit 65 for acquiring the OAM type request flag 61D corresponding to the user 61A identified by the output-side user identification unit 62, and an output-side OAM type PID acquisition unit 66 for acquiring, from the output-side user management table 61, the OAM type PID 61E corresponding to the user 61A identified by the output-side user identification unit 62.

The third flow identification unit 31 includes an output-side flag judgment unit 67 for judging whether the OAM type request flag 61D acquired by the output-side OAM type request flag acquisition unit 65 is "ON" or not, a monitor rate management table 68 for managing the monitor rate 68B for each PID 68A, and an output-side OAM policing setting unit 69 for setting the monitor rate of the output-side OAM policer unit 32 at the time of policing the OAM packets extracted by the output-side packet separation/extraction unit 63.

When the output-side flag judgment unit 67 judges that the OAM type request flag 61D is "ON", the output-side OAM policing setting unit 69 acquires, from the monitor rate management table 68, the monitor rate 68B for the OAM type corresponding to the OAM type PID 61E for each OAM type of the user which is acquired by the output-side OAM type PID acquisition unit 66. The monitor rate thus acquired is set as the monitor rate for the output-side OAM policer unit 32 of each OAM type of the particular user.

The output-side OAM policer unit 32, based on the monitor rate 68B for the OAM type corresponding to the OAM type PID 61E for each OAM type (CC, LB, LT) of the user, executes the process of controlling by policing the OAM packets of the particular user for each OAM type (CC, LB, LT) according to the single token bucket scheme.

When the output-side flag judgment unit 67 judges that the OAM type request flag 61D is "OFF", the output-side OAM policing setting unit 69 acquires, from the monitor rate management table 68, the OAM monitor rate 68B for each user corresponding to the user PID 61C acquired by the output-side user PID acquisition unit 64. The monitor rate thus acquired is set as the monitor rate for the output-side OAM policer unit 32 of the OAM packets of the particular user.

The output-side OAM policer unit 32, based on the OAM monitor rate 68B for each user corresponding to the user PID 61C, executes the process of controlling by policing the OAM packets of the particular user according to the single token bucket scheme.

Figure 7:
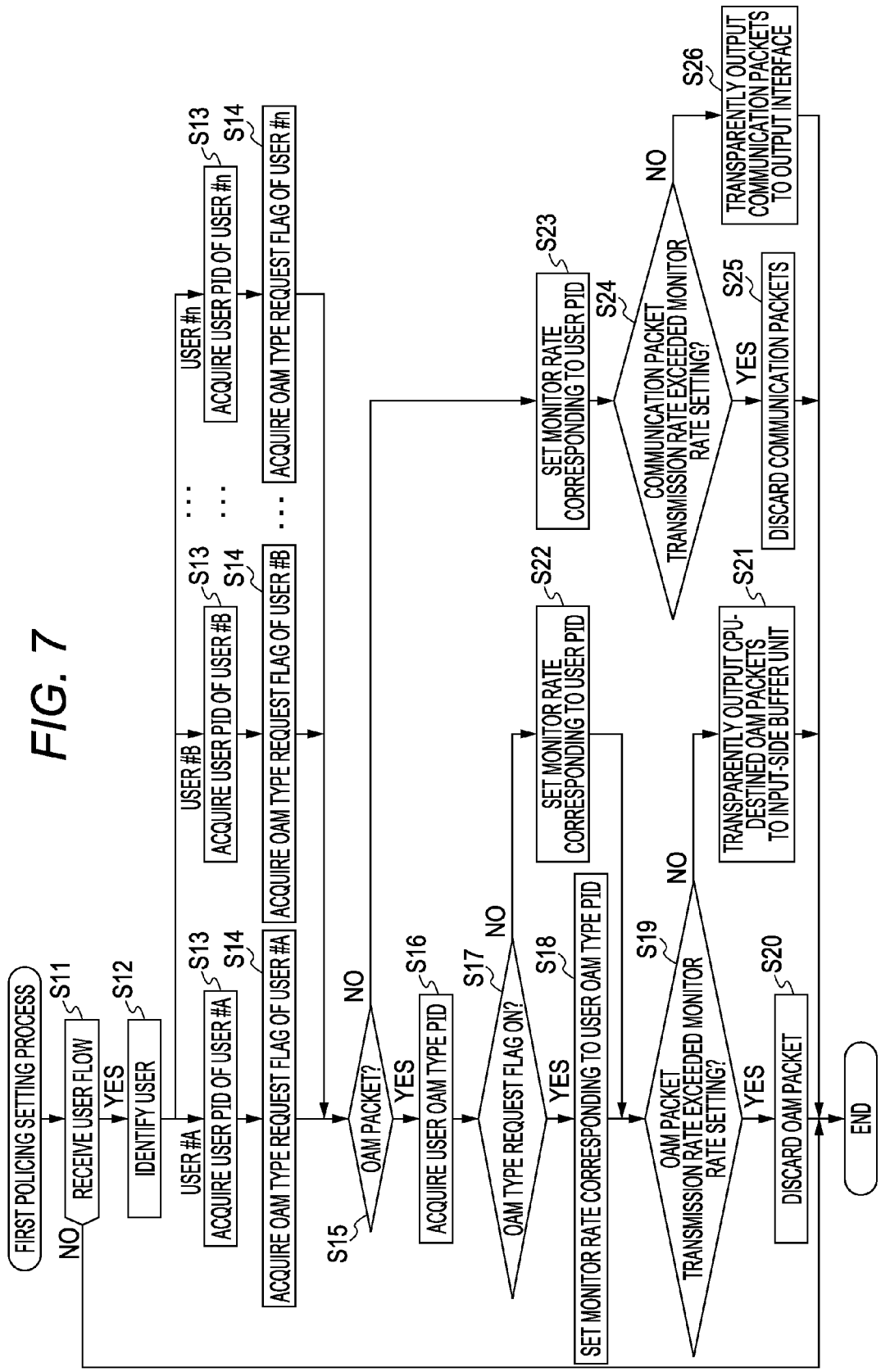
FIG. 7 is a flowchart illustrating the processing operation on the input port unit side for the first policing setting process in the packet transmission apparatus according to the first embodiment.

Now, the operation of the packet transmission apparatus 1 according to the first embodiment will be explained. FIG. 7 is a flowchart of the processing operation on the input port unit 11 side for the first policing setting process in the packet transmission apparatus 1 according to the first embodiment.

The first policing setting process in FIG. 7 is for controlling by policing the communication packets on the side of the input-side communication policer unit 23 while at the same time controlling by policing the OAM packets on the side of the input-side OAM policer unit 24.

The input-side user identification unit 42 illustrated in FIG. 2, upon reception of the user flow (YES in S11), identifies the user of the user flow (step S12).

The input-side user PID acquisition unit 43 acquires, from the input-side user management table 41, the user PID 41B corresponding to the user 41A identified by the input-side user identification unit 42 (step S13).

The input-side OAM type request flag acquisition unit 44 acquires, from the input-side user management table 41, the OAM type request flag 41C corresponding to the user 41A identified by the input-side user identification unit 42 (step S14). As a result, the user PID 41B and the OAM type request flag 41C are transmitted from the first flow identification unit 21 to the second flow identification unit 22 as the additional information added to the user flow for each user 41A.

The input-side packet separation/extraction unit 52 of the second flow identification unit 22 judges whether the user flow includes OAM packets or not (step S15).

When the user flow includes OAM packets (YES in step S15), the input-side OAM type PID acquisition unit 55 of the second flow identification unit 22 acquires, from the input-side OAM type management table 51, the OAM type PID 51C corresponding to each OAM type (CC, LB, LT) of the particular user which is contained in the additional information (step S16).

The input-side flag judgment unit 56 of the second flow identification unit 22 judges whether the OAM type request flag 41C of the particular user contained in the additional information is "ON" or not (step S17).

When the OAM type request flag 41C of the particular user which is contained in the additional information is "ON" (YES in step S17), the input-side OAM policing setting unit 57 of the second flow identification unit 22 acquires, from the monitor rate management table 53, the monitor rate 53B corresponding to the OAM type PID 51C acquired in step S16. The monitor rate of each OAM type (CC, LB, LT) thus acquired is set in the input-side OAM policer unit 24 (step S18).

The input-side OAM policer unit 24 executes the process of controlling by policing the OAM packets of the particular user according to the single token bucket scheme based on the monitor rate set by the input-side OAM policing setting unit 57, and judges whether or not the transmission rate of the OAM packets has exceeded the monitor rate setting (step S19).

When the transmission rate of the OAM packets exceeds the monitor rate setting (YES in step S19), the input-side OAM policer unit 24 discards the OAM packets (step S20) and ends the processing operation illustrated in FIG. 7. As a result, the input-side OAM policer unit 24 reduces the burden which otherwise might be imposed by the OAM packets on the input-side buffer 25 and the CPU 13.

When the transmission rate of the OAM packets has not exceeded the monitor rate setting (NO in step S19), the input-side OAM policer unit 24 transparently outputs the OAM packets destined to the CPU 13 and sequentially stores them in the input-side buffer 25 (step S21), thereby finishing the processing operation illustrated in FIG. 7. As a result, the input-side OAM policer unit 24 transmits the OAM packets sequentially at a rate tolerable for the CPU 13 and without imposing any burden on the CPU 13 or on the input-side buffer unit 25.

When the OAM type request flag 41C of the particular user contained in the additional information is "OFF" (NO in step S17), the input-side OAM policing setting unit 57 acquires, from the monitor rate management table 53, the monitor rate 53B for the communication packets corresponding to the user PID 41B acquired in step S13. The monitor rate thus acquired for each user is set in the input-side OAM policer unit 24 (step S22) and the process proceeds to step S19 to judge whether the transmission rate of the particular OAM packets has exceeded the monitor rate setting or not.

When step S15 judges that the user flow includes communication packets (NO in step S15), the input-side communication policing setting unit 54 acquires, from the monitor rate management table 53, the monitor rate 53B for the communication packets corresponding to the user PID 41B acquired in step S13, and sets the acquired monitor rate for each user in the input-side communication policer unit 23 (step S23).

The input-side communication policer unit 23 executes the process of controlling by policing the communication packets of the user in accordance with the dual token bucket scheme based on the monitor rate set by the input-side communication policing setting unit 54, and judges whether or not the transmission rate of the communication packet has exceeded the monitor rate setting (step S24).

When the transmission rate of the communication packet has exceeded the monitor rate setting (YES in step S24), the input-side communication policer unit 23 discards the communication packets (step S25) and ends the processing operation illustrated in FIG. 7. As a result, the input-side communication policer unit 23 may smoothly transmit the communication packets to another party.

When the transmission rate of the communication packet has not exceeded the monitor rate setting (NO in step S24), the input-side communication policer unit 23 transparently outputs the communication packets and outputs the communication packets of the other party through the output interface (step S26), thereby ending the processing operation illustrated in FIG. 7. As a result, the input-side communication policer unit 23 may smoothly transmit the communication packets to the other party.

Also, when step S11 judges that the user flow is not received (NO in step S11), the input-side user identification unit 42 ends the processing operation illustrated in FIG. 7.

Also, the input-side user identification unit 42, upon identification of the user flow in step S12, executes the operation of acquiring the user PID 41B and the OAM type request flag 41C for each user through the process of steps S13 and S14.

In the first policing setting process illustrated in FIG. 7, upon identification of the user of the user flow, the user PID 41B, the OAM type request flag 41C and the OAM PID 51C corresponding to the identified user are acquired. When the OAM type request flag 41C is "ON", the monitor rate for each OAM type (CC, LB, LT) corresponding to the OAM type PID 51C is set as that for the input-side OAM policer unit 24 thereby to execute the police control process according to the single token bucket scheme for each OAM type of each user. As a result, the burden of the OAM packets on the CPU 13 and the input-side buffer unit 25 may be reduced.

When the OAM type request flag 41C is "OFF" in the first policing setting process, the monitor rate for the communication packets corresponding to the user PID 41B is set as that for the input-side OAM policer unit 24, and the process of controlling by policing the OAM packets is executed for each user according to the single token bucket scheme. As a result, the burden of the OAM packets on the CPU 13 and the input-side buffer unit 25 may be reduced.

Also, in the first policing setting process, the monitor rate for the communication packets corresponding to the user PID 41B is set as that for the input-side communication policer unit 23, and the communication packets are police controlled for each user according to the dual token bucket scheme. Therefore, the communication packets may be transmitted smoothly to other parties.

Next, the operation of the third flow identification unit 31 of the output port unit 12 is explained.

The output-side user identification unit 62 in the third flow identification unit 31 on the output port unit 12 side, upon reception of the user flow, identifies the user of the user flow based on the address information of the user flow as illustrated in FIG. 5.

Further, the output-side packet separation/extraction unit 63 in the third flow identification unit 31 separates and extracts the communication packets and the OAM packets.

The output-side user PID acquisition unit 64 acquires, from the output-side user management table 61, the user PID 61C corresponding to the user identified by the output-side user identification unit 62. The output-side OAM type request flag acquisition unit 65 acquires, from the output-side user management table 61, the OAM type request flag 61D corresponding to the user identified by the output-side user identification unit 62.

Further, the output-side OAM type PID acquisition unit 66 acquires, from the output-side user management table 61, the OAM type PID 61E for each OAM type (CC, LB, LT) corresponding to the user identified by the output-side user identification unit 62.

The output-side flag judgment unit 67 judges whether the OAM type request flag 61D of the user flow is "ON" or not.

When the output-side flag judgment unit 67 judges that the OAM type request flag 61D is "ON", the output-side OAM policing setting unit 69 acquires, from the monitor rate management table 68, the monitor rate for the OAM type corresponding to the OAM type PID 61E for each OAM type (CC, LB, LT) of the user acquired by the output-side OAM type PID acquisition unit 66. The monitor rate thus acquired is set as that for the output-side OAM policer unit 32 of each OAM type of the particular user.

The output-side OAM policer unit 32 sets the monitor rate with the OAM type PID 61E, and when the transmission rate of the OAM packet for each OAM type exceeds the monitor rate, discards the particular OAM packet. As a result, the output-side OAM policer unit 32 may reduce the burden of the OAM packets on the output-side buffer unit 33 and the CPU 13.

When the transmission rate of the OAM packets for each OAM type has not exceeded the monitor rate, the output-side OAM policer unit 32 sequentially stores the OAM packets destined for the CPU 13 in the output-side buffer unit 33. As a result, the output-side OAM policer unit 32 may transmit the OAM packets sequentially at the rate tolerable for the CPU 13 and without imposing any burden on the CPU 13 or on the output-side buffer unit 33.

When the output-side flag judgment unit 67 judges that the OAM type request flag 61D is "OFF", the output-side OAM policing setting unit 69 acquires, from the monitor rate management table 68, the OAM monitor rate 68B for each user corresponding to the user PID 61C acquired by the output-side user PID acquisition unit 64. The monitor rate thus acquired is set as the monitor rate of the output-side OAM policer unit 32 of the OAM packets of the particular user.

The output-side OAM policer unit 32 sets the monitor rate with the user PID 61C, and when the transmission rate of the OAM packet for each user has exceeded the monitor rate, discards the particular OAM packet. As a result, the output-side OAM policer unit 32 may reduce the burden of the OAM packets on the output buffer unit 33 and the CPU 13.

When the transmission rate of the OAM packets for each user has not exceeded the monitor rate, the output-side OAM policer unit 32 sequentially stores the OAM packets destined for the CPU 13 in the output-side buffer unit 33. As a result, the output-side OAM policer unit 32 may transmit the OAM packets sequentially at the rate tolerable for the CPU 13 without imposing any burden on both the CPU 13 and the output-side buffer unit 33.

According to the first embodiment, upon identification of the user of the user flow, the user PID 41B, the OAM type request flag 41C, and the OAM type PID 51C corresponding to the identified user are acquired, and when the OAM type request flag 41C is "ON", the monitor rate for each OAM type (CC, LB, LT) corresponding to the OAM type PID 51C is set as the monitor rate for the input-side OAM policer unit 24. Then, the police control operation is carried out according to the single token bucket scheme for each OAM type of the OAM packets of each user. According to the first embodiment, therefore, the burden of the OAM packets on the CPU 13 and the input-side buffer unit 25 may be reduced. As a result, the reduction in the processing ability and the hang-up of the CPU 13, the overflow of the buffer, and the line switching judgment error may be prevented, while at the same time making it possible to avoid the situation in which the abnormal rates of the OAM packets between users affect each other.

Also, according to the first embodiment, when the OAM type request flag 41C is "OFF", the monitor rata corresponding to the user PID 41B is set as that for the input-side OAM policer unit 24, and the OAM packets for each user are controlled by policing according to the single token bucket scheme. As a result, the burden of the OAM packets on the CPU 13 and the input buffer unit 25 may be reduced.

Also, according to the first embodiment, the monitor rate corresponding to the user PID 41B is set as that for the input-side communication policer unit 23, and the communication packets of each user are controlled by policing according to the dual token bucket scheme. Therefore, the communication packets may be transmitted smoothly to the other party.

Also, according to the first embodiment, the single token bucket scheme is employed for controlling by policing the OAM packets. Therefore, as compared to the dual token bucket scheme used for controlling by policing the communication packets, the memory capacity may be reduced.

Also, according to the first embodiment, once the user of the user flow is identified, the user PID 61C, the OAM type request flag 61D, and the OAM type PID 61E corresponding to the user thus identified are acquired. Then, when the OAM type request flag 61D is "ON", the monitor rate for each OAM type (CC, LB, LT) corresponding to the OAM type PID 61E is set as the monitor rate for the output-side OAM policer unit 32, and the OAM packets of each user are controlled by policing operation for each OAM type (CC, LB, LT) according to the single token bucket scheme. According to the first embodiment, therefore, the burden of the OAM packets on the CPU 13 and the output-side buffer unit 33 may be reduced. As a result, the reduction in the processing ability and the hang-up of the CPU 13, the overflow of the buffer and the erroneous judgment of line switching may be reduced if not prevented while at the same time making it possible to avoid the situation in which abnormal rates of the OAM packets between the users affect each other.

Also, according to the first embodiment, when the OAM type request flag 61D is "OFF", the OAM monitor rate for each user corresponding to the user PID 61C is set as the monitor rate for the output-side OAM policer unit 32, and the OAM packets are controlled by policing for each user according to the single token bucket scheme. As a result, the burden of the OAM packets on the CPU 13 and the output buffer unit 33 may be reduced.

Also, according to the first embodiment, the monitor rate of the input-side OAM policer unit 24 and the monitor rate of the output-side OAM policer unit 32 are not set directly, but managed with PID for each user. As a result, the maintenance operator may change the PID setting for each user. By assigning the same PID to a plurality of users, therefore, an arbitrary group may be set, and the policing control operation may be carried out at the monitor rate for each group.

Also, according to the first embodiment, the monitor rate is managed with the PID (OAM type PID 51C) for each OAM type of the user, and the PID (OAM type PID 51C) setting may be changed in accordance with the service contents for each OAM type. Thus, the policing control operation may be realized at the monitor rate corresponding to the service contents of the OAM type, while at the same time making it possible to make the most of the limited packet processing ability of the CPU 13.

According to the first embodiment, the input-side user management table 41, the input-side OAM type management table 51, and the monitor rate management table 53 in the input port unit 11 are arranged separately from the output-side user management table 61 and the monitor rate management table 68 in the output port unit 12. Nevertheless, the same items of these tables may be integrally managed as a single table. By doing so, the memory capacity of the apparatus as a whole may be further reduced.

Also, according to the first embodiment, the monitor rate of the OAM packets for the input-side OAM policer unit 24 or the output-side OAM policer unit 32 is set as the monitor rate corresponding to the user PID 41B or the OAM type PID 51C based on the OAM type request flag 41C. However, originally, the provision of the policer unit for the OAM packets (input-side OAM policer unit 24 or output-side OAM policer unit 32) separate from the policer unit for the communication packets (input-side communication policer unit 23) may reduce the burden on the CPU 13 and the buffer units (input-side buffer unit 25 and output-side buffer unit 33). Without setting the OAM type request flag 41C, therefore, a similar advantage may be obtained by setting the monitor rate corresponding to the monitor rate of the user PID 41B and the OAM type PID 51C in the input-side OAM policer unit 24 or the output-side OAM policer unit 32.

Also, according to the first embodiment, when the input-side flag judgment unit 56 in the second flow identification unit 22 judges that the OAM type request flag 41C is "OFF", the monitor rate for the communication packets corresponding to the user PID 41B acquired by the input-side user PID acquisition unit 43 is set in the input-side OAM policer unit 24. However, originally, the user PID 41B corresponds to the monitor rate of the communication packets for each user and is set high compared to the monitor rate of the OAM packets. In order to improve the policing effect of the OAM packets, therefore, the PID dedicated to the OAM (hereinafter referred to as "the OAM-only PID") corresponding to the monitor rate of the OAM packet may be set. The packet transmission system based on this configuration is explained below as a second embodiment.

Figure 8:
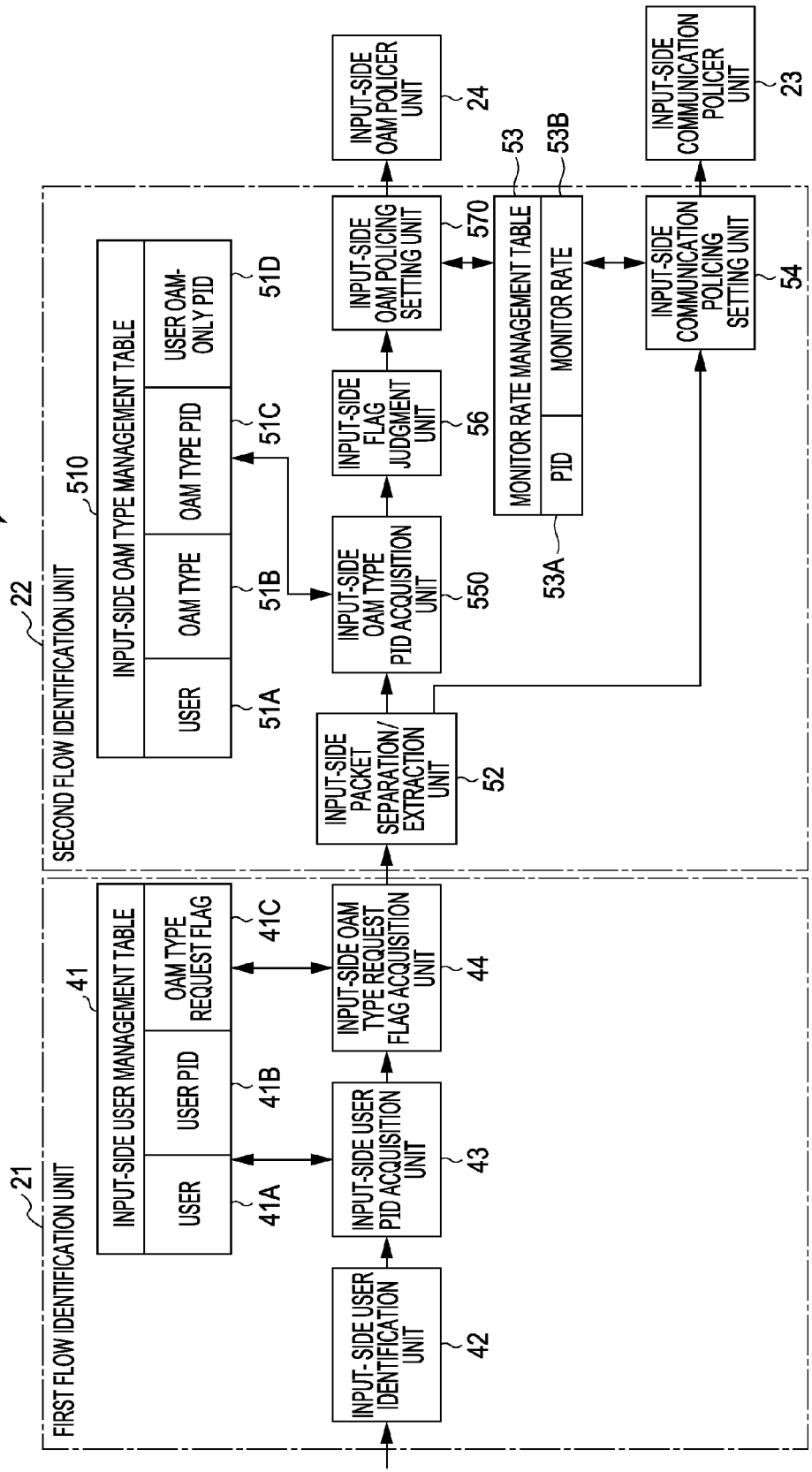
FIG. 8 is a block diagram illustrating the configuration of the first flow identification unit and the second flow identification unit in the input port unit in the packet transmission apparatus according to a second embodiment.

FIG. 8 is a block diagram of the configuration of the input port unit 11 of the packet transmission apparatus according to the second embodiment. Incidentally, the same component parts as those of the packet transmission apparatus 2 according to the first embodiment are designated by the same reference numerals, respectively, and not explained again.

The difference between the packet transmission apparatus according to the first embodiment and the packet transmission apparatus according to the second embodiment resides in the internal configuration of the input-side OAM type management table 510, the input-side OAM type PID acquisition unit 550, and the input-side OAM policing setting unit 570 in the second flow identification unit 22 of the input port unit 11.

The input-side OAM type management table 510, in addition to the OAM type 51B and the OAM type PID 51C, manages a user OAM-only PID 51D corresponding to the OAM-only monitor rate corresponding to the user 51A.

The maintenance operator may appropriately change, by an input operation, the user 51A, the OAM type 51B, the OAM type PID 51C, and the user OAM-only PID 51D in the input-side OAM type management table 510.

The OAM-only monitor rate corresponding to the user OAM-only PID 51D is low compared to the monitor rate for the communication packets corresponding to the user PID 41B, and is equivalent to the monitor rate corresponding to the OAM packets.

Further, the input-side OAM type PID acquisition unit 550 acquires, from the input-side OAM type management table 510, the OAM type PID 51C and the user OAM-only PID 51D corresponding to the user 51A contained in the additional information of the user flow.

When the input-side flag judgment unit 56 judges that the OAM type request flag 41C is "ON", the input-side OAM policing setting unit 570 acquires the monitor rate 53B for the OAM type corresponding to the OAM type PID 51C from the monitor rate management table 53. The monitor rate thus acquired is set as the monitor for the input-side OAM policer unit 24 of each OAM type of the particular user.

When the input-side flag judgment unit 56 judges that the OAM type request flag 41 is "OFF", the input-side OAM policing setting unit 570 acquires the OAM-only monitor rate 53B corresponding to the user OAM-only PID 51D from the monitor rate management table 53, and sets the acquired monitor rate as the monitor rate for the input-side OAM policer unit 24 of the particular user.

The input-side OAM policer unit 24 executes the process of controlling by policing the OAM packets of the particular user according to the single token bucket scheme based on the OAM-only monitor rate corresponding to the user OAM-only PID 51D.

Figure 9:
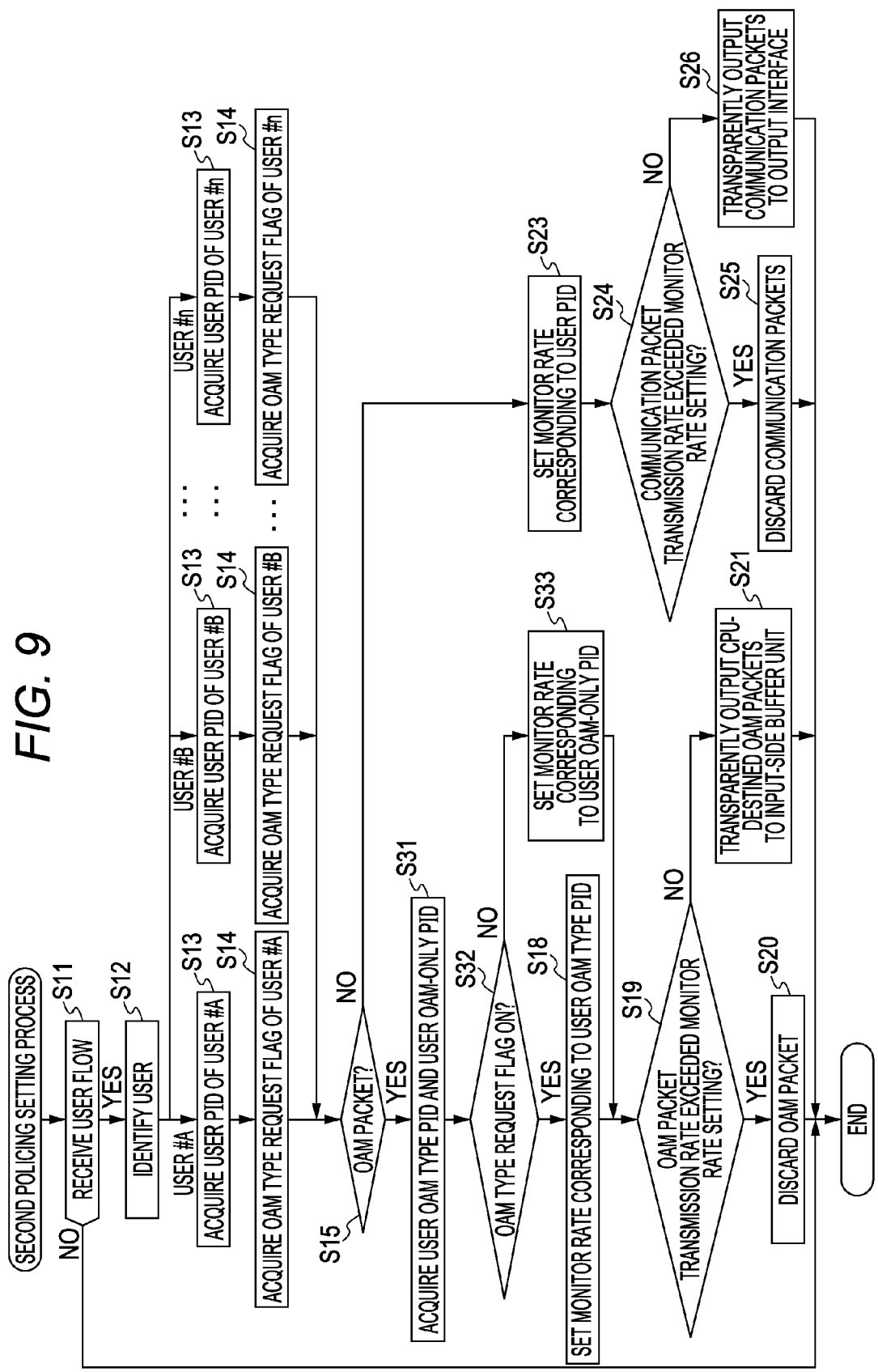
FIG. 9 is a flowchart illustrating the processing operation of the input port unit for the second policing setting process according to the second embodiment.

Next, the operation of the packet transmission system according to the second embodiment is explained. FIG. 9 is a flowchart illustrating the processing operation of the input port unit 11 for the second policing setting process according to the second embodiment.

When step S15 judges that the user includes OAM packets, the input-side OAM type PID acquisition unit 550 illustrated in FIG. 8 acquires the OAM type PID 51C and the user OAM-only PID 51D corresponding to each OAM type of the particular user contained in the additional information (step S31).

The input-side flag judgment unit 56 judges whether the OAM type request flag 41C of the particular user contained in the additional information is "ON" or not (step S32).

When the OAM type request flag 41C of the particular user contained in the additional information is "ON" (YES in step S32), the input-side OAM policing setting unit 570 acquires, from the monitor rate management table 53, the monitor rate 53B for the OAM type corresponding to the OAM type PID 51C acquired in step S31. Then, the process proceeds to step S18 to set the acquired monitor rate of each OAM type in the input-side OAM policer unit 24.

When the OAM type request flag 41C of the particular user contained in the additional information is "OFF" (NO in step S32), the input-side OAM policing setting unit 570 acquires, from the monitor rate management table 53, the OAM-only monitor rate 53B corresponding to the user OAM-only PID 51D acquired in step S31. Then, the input-side OAM policing setting unit 570, after setting the acquired user OAM-only monitor rate in the input-side OAM policer unit 24 (step S33), proceeds to step S19 to execute policing control operation according to the single token bucket scheme based on the monitor rate thus set.

According to the second embodiment, even when the OAM type request flag 41C is "OFF", the OAM-only monitor rate is set which corresponds not to the user PID 41B of the communication packets but to the OAM-only user PID, i.e., the user OAM-only PID 51D. Therefore, compared to the first policing setting process in FIG. 7, the optimum policing control corresponding to the OAM-only monitor rate may be realized.

According to the second embodiment described above, the monitor rate of the OAM packets is set in the input-side OAM policer unit 24 or the output-side OAM policer unit 32 based on the OAM type request flag 41C in such a manner that the monitor rate corresponds to the OAM type PID 51C or the user OAM-only PID 51D. However, originally, the provision of the policer unit for the OAM packets (input-side OAM policer unit 24 or output-side OAM policer unit 32) separately from the policer unit for the communication packets (input-side communication policer unit 23) may reduce the burden on the CPU 13 and the buffer unit (input-side buffer unit 25 and output-side buffer unit 33). Therefore, without setting the OAM type request flag 41C, a similar effect may be obtained by setting the monitor rate corresponding to one of the OAM type PID 51C or the user OAM-only PID 51D in the input-side OAM policer unit 24 or the output-side OAM policer unit 32.

A similar effect may be obtained, without the user OAM-only PID 51D, also in such a manner that when the OAM type request flag 41C is "ON", the monitor rate corresponding to the OAM type PID 51C of the same monitor rate as the user OAM-only PID 51D is set in the input-side OAM policer unit 24 or the output-side OAM policer unit 32.

Also, according to the first embodiment, the output-side OAM policer unit 32 and the output-side buffer unit 33 are arranged inside the output port unit 12. As an alternative, the output-side OAM policer unit 32 and the output-side buffer unit 33 inside the output port unit 12 may double as the input-side OAM policer unit 24 and the input-side buffer unit 25, respectively, in the input port unit 11. This configuration is explained as a third embodiment below.

Figure 10:
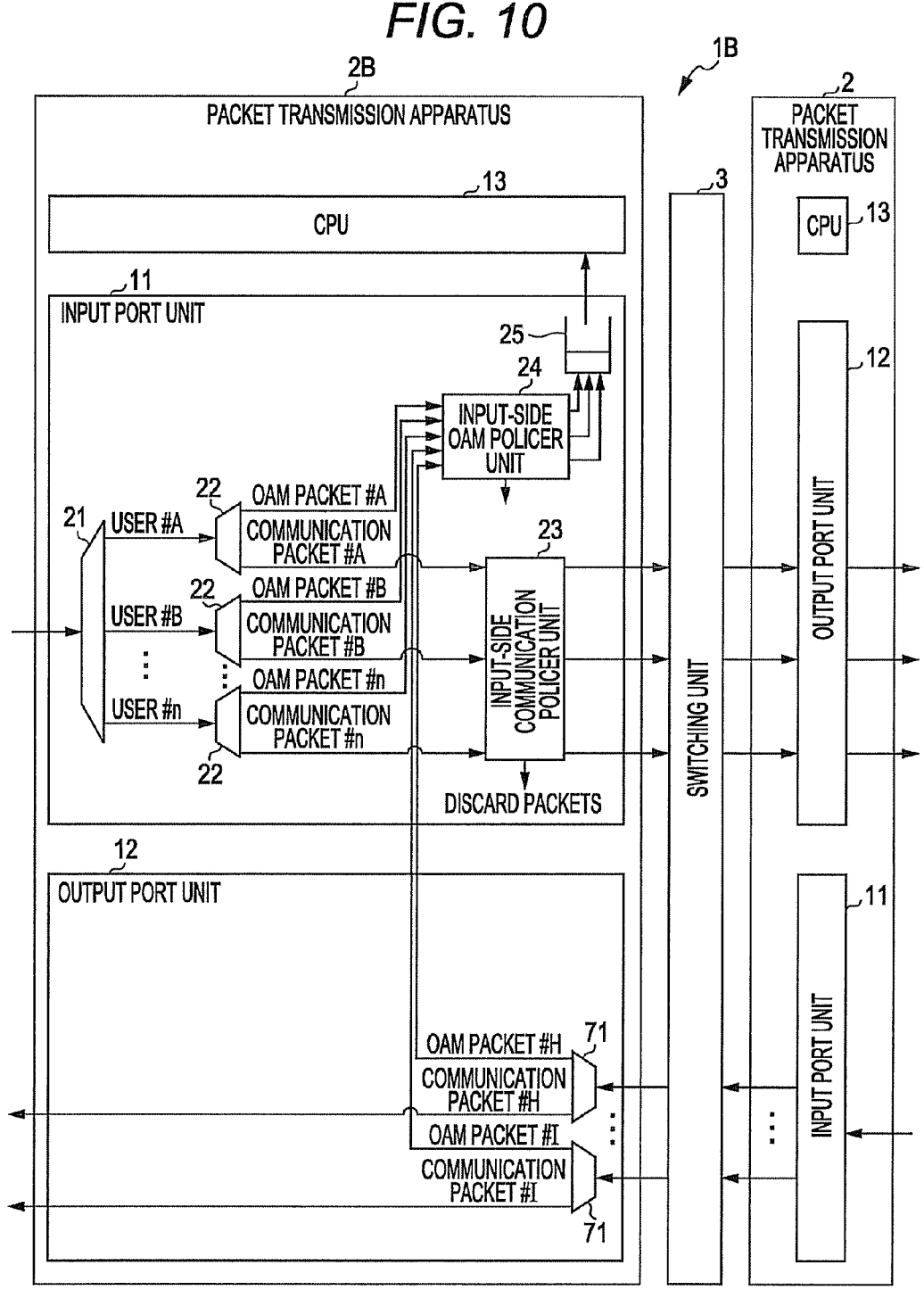
FIG. 10 is a block diagram illustrating the configuration of the packet transmission system according to a third embodiment.
Figure 11:
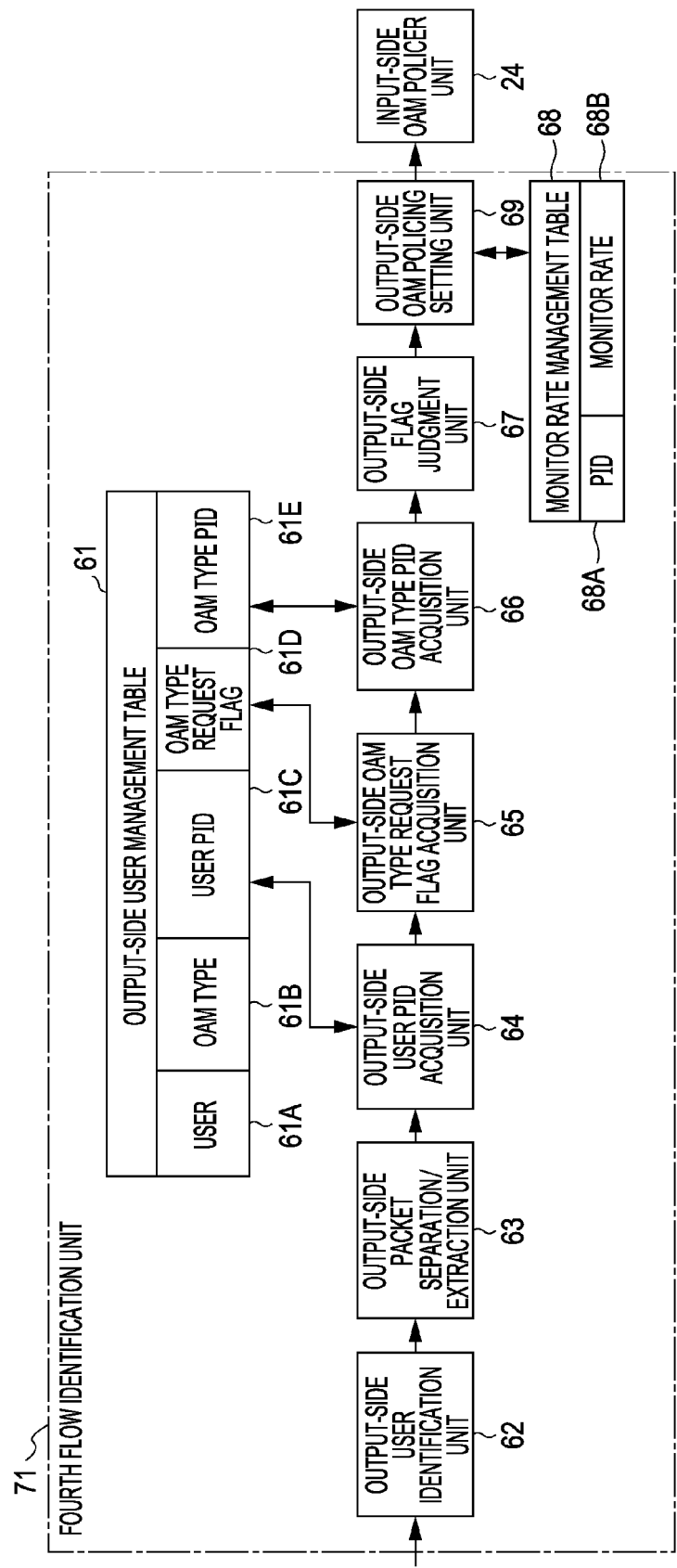
FIG. 11 is a block diagram illustrating the configuration of a fourth flow identification unit.

FIG. 10 is a block diagram of the configuration of the packet transmission system according to the third embodiment, and FIG. 11 is a block diagram of the configuration of the fourth flow identification unit inside the output port unit 12. The same component parts as those of the packet transmission system 1 according to the first embodiment are designated by the same reference numerals, respectively, and the same configuration and operation thereof are not explained again.

In the packet transmission apparatus 2B of the packet transmission system 1B illustrated in FIG. 10, the output-side OAM policer unit 32 and the output-side buffer unit 33 are not included in the output port unit 12, but the output-side OAM policer unit 32 and the output-side buffer unit 33 double as the input-side OAM policer unit 24 and the input-side buffer unit 25, respectively. Thus, the monitor rate corresponding to the OAM packets received by a fourth flow identification unit 71 of the output port unit 12 is set in the input-side OAM policer unit 24. The fourth flow identification unit 71 in FIG. 11 has substantially the same configuration as the third flow identification unit 31 in FIG. 5.

Now, the operation of the packet transmission system 1B according to the third embodiment is explained with reference to FIGS. 10 and 11.

The fourth flow identification unit 71 illustrated in FIG. 11 receives the user flow, and acquires the user PID 61C, the OAM type request flag 61D, and the OAM type PID 61E corresponding to the user from the output-side user management table 61. When the OAM type request flag 61D is "ON", the monitor rate for the OAM type corresponding to each OAM type PID 61E is set in the input-side OAM policer unit 24.

The input-side OAM policer unit 24, based on each monitor rate for the OAM type corresponding to each OAM type PID 61E, executes the process of controlling by policing the OAM packets of the particular user for each OAM type according to the single token bucket scheme.

Also, when the OAM type request flag 61D is "OFF", the fourth flow identification unit 71 sets the user OAM monitor rate corresponding to the user PID 61C in the input-side OAM policer unit 24.

The input-side OAM policer unit 24, based on the monitor rate corresponding to the user PID 61C, executes the process of controlling by policing the OAM packets of the particular user according to the single token bucket scheme.

For example, assume that the user flow of a user #F is received on the input port unit 11 side and the user flow of a user #H on the output port unit 12 side. As illustrated in FIGS. 3 and 4, the user PID of the user #F is set to "6", the OAM type request flag is turned "ON", the CC of the OAM type PID is set to "50", LB to "51", and LT to "52". Similarly, as in FIG. 6, the user PID of the user #H is set to "6", the OAM type request flag is turned "ON", the CC of the OAM type PID is set to "50", LB to "51", and LT to "52". In this way, assume the case in which the PID is shared by the users #F and #H.

The first flow identification unit 21 and the second flow identification unit 22 of the input port unit 11 receive the user flow, and acquire the user PID 41B corresponding to the user #F as "6", the OAM type request flag 41C as "ON", the CC of the user OAM type PID 51C as "50", LB as "51", and LT as "52". Then, the monitor rate for the OAM type corresponding to each user OAM type PID 51C for the OAM packets of the user #F is set in the input-side OAM policer unit 24.

Also, the fourth flow identification unit 71 of the output port unit 12 receives the user flow, and acquires the user PID 61C corresponding to the user #H as "6", the OAM type request flag 61D as "ON", the CC of the OAM type PID 61E as "50", LB as "51", and LT as "52". Then, the monitor rate for the OAM type corresponding to each OAM type PID 61E of the OAM packets of the user #H is set in the input-side OAM policer unit 24.

As a result, the input-side OAM policer unit 24 sets the monitor rate for the OAM type corresponding to the same OAM type PID 61E for the OAM packets of the users #F and #H. In this way, the OAM packets of the users #F and #H may be controlled by policing according to the single token bucket scheme at the same monitor rate.

When the user flow of the user #G is received on the input port unit 11 side and the user flow of the user #I on the output port unit 12 side, as in FIGS. 3 and 4, the user PID 41B of the user #G is set to "8", the OAM type request flag 41C is turned "OFF", the CC of the user OAM type PID 51C is set to "60", LB to "61", and LT to "62". Similarly, as in FIG. 6, the user PID 61C of the user #I is set to "8", the OAM type request flag 61D is turned "OFF", the CC of the user OAM type PID 61E is set to "60", LB to "61", and LT to "62". As in this case, assume that the PID is shared by the users #G and #I.

In this case, the first flow identification unit 21 and the second flow identification unit 22 of the input port unit 11 receive the user flow, and acquire the user PID 41B corresponding to the user #G as "8", the OAM type request flag 41C as "OFF", the CC of the user OAM type PID 51C as "60", LB as "61", and LT as "62". Then, the monitor rate for the communication packets corresponding to the user PID "8" for the OAM packets of the user #G is set in the input-side OAM policer unit 24.

Also, the fourth flow identification unit 71 of the output port unit 12 receives the user flow, and acquires the user PID 61C corresponding to the user #I as "8", the OAM type request flag 61D as "OFF", the CC of the user OAM type PID 61E as "60", LB as "61", and LT as "62". Then, the monitor rate for the user OAM corresponding to the user PID "8" for the OAM packets of the user #I is set in the input-side OAM policer unit 24.

As a result, the input-side OAM policer unit 24 sets the monitor rate for the communication packets (or the user OAM) corresponding to the same user PID "8" shared by the OAM packets of the users #G and #I, and executes the process of controlling by policing the OAM packets of the users #G and #I at the same monitor rate according to the single token bucket scheme.

According to the third embodiment, the output-side OAM policer unit 32 and the output-side buffer unit 33 are not included in the output port unit 12, but double as the input-side OAM policer unit 24 and the input-side buffer unit 25 in the input port unit 11; and the monitor rate corresponding to the OAM packets received by the fourth flow identification unit 71 of the output port unit 12 side is set in the input-side OAM policer unit 24. Therefore, compared to the packet transmission apparatus 2 according to the first embodiment, the memory capacity may be reduced in an amount equivalent to that of the output-side OAM policer unit 32 and the output-side buffer unit 33.

Also, according to the third embodiment, the OAM packets of the users received by the input port unit 11 and the output port unit 12 are set at the same monitor rate, and therefore, the memory consumption may be reduced.

According to the third embodiment described above, the OAM packet monitor rate corresponding to the user PID 41B or the OAM type PID 51C is set, based on the OAM type request flag 41C, in the input-side OAM policer unit 24. However, originally, the provision of the policer unit for the OAM packets (input-side OAM policer unit 24) separate from the policer unit for the communication packets (input-side communication policer unit 23) may reduce the burden on the CPU 13 and the buffer unit (input-side buffer unit 25). Therefore, without setting the OAM type request flag 41C, a similar effect may be obtained by setting the monitor rate corresponding to one of the user PID 41B or the OAM type PID 51C or 61E in the input-side OAM policer unit 24.

Also, according to the first to third embodiments described above, the monitor rate is managed with PID. However, an arrangement may be made in which the monitor rate corresponding to a specified PID "0" is set as "nil" so that when the specified PID "0" is acquired by the second flow identification unit 22 or the third flow identification unit 31 (fourth flow identification unit 71), the policing control operation is not carried out on the input-side OAM policer unit 24 side or the output-side OAM policer unit 32 side. In this case, whether the policing control operation on the OAM packets is executed or not may be easily set.

Similarly, a monitor rate high enough to make it substantially impossible to obtain the effect of policing the OAM packets may be assigned to a specified PID, and upon acquisition of such a specified PID on the second flow identification unit 22 side or the third flow identification unit 31 (fourth flow identification unit 71) side, a high monitor rate may be set on the input-side OAM policer unit 24 side or the output-side OAM policer unit 32 side. In this case, the effect of policing the OAM packets cannot be substantially obtained, and therefore, whether the policing control operation on the OAM packets is executed or not may be easily set.

As another alternative, an independent setting flag not to execute the policing control operation on the OAM packets is provided so that the policing control operation on the OAM packets may be prohibited based on the particular setting flag. In this case, whether the policing control operation on the OAM packets is executed or not may be easily set.

Also, according to the first to third embodiments described above, the input-side OAM policing setting unit 57 or the output-side OAM policing setting unit 69 sets the monitor rate corresponding to the OAM type PID or the user PID of the OAM packets on the input-side OAM policer unit 24 and or output-side OAM policer unit 32, respectively. However, when the monitor rate set on the input-side OAM policer unit 24 or the output-side OAM policer unit 32 exceeds the tolerable rate of the CPU 13, the setting of the particular monitor rate may be rejected, and when the monitor rate set does not exceed the tolerable rate of the CPU 13, the setting of the monitor rate may be permitted.

Also, according to the first to third embodiments described above, the OAM packets may be discarded by a policing-control operation according to the single token bucket scheme on the input-side OAM policer unit 24 side or the output-side OAM policer unit 32 side using a counter for counting the number of discarded packets. For example, the number of the OAM packets discarded is statistically determined in units of the port, the service, or the OAM type; and the statistical result may be displayed on a display unit (not shown). A similar counter may be used to count the number of packets discarded for the input-side communication policer unit 23.

Although the first to third embodiments described above represent a case in which the OAM packets are of three types CC, LB, and LT, the invention is not limited to these three types.

The embodiments of the invention described above should not be interpreted to limit the scope of the technical concept of the present invention, and the invention may be embodied in various forms without departing from the scope of the technical concept described in the appended claims. Also, the effects described in the embodiments are illustrative and not limitative.

Also, the whole or a part of the various processes described above in the embodiments as automatically executable may be executed manually, and conversely, the whole or a part of the processes described as manually executed may be executed automatically. Further, unless otherwise specified, the processing steps, the control steps, the specific names, the various data, and other information including parameters described in the embodiments above may be changed appropriately.

Further, the function of each component element of each device illustrated in the drawings is described conceptually but may not necessarily be physically configured as illustrated. Thus, the specific form of each device is not confined to the illustrated one.

Furthermore, the whole or an arbitrary part of the various processing functions executed by the devices described above may be executed alternatively by the CPU (central processing unit) (or a microcomputer such as a MPU (micro processing unit) or MCU (micro controller unit)), the program analyzed and executed by the CPU (or a microcomputer such as a MPU or MCU), or the hardware based on the wired logics.

In the packet transmission apparatus and the packet transmission method described above, the maintenance packets are extracted from the user flow, and the transparent output of the maintenance packets thus extracted is controlled based on the monitor rate setting, for example, by the policing-control operation on the extracted maintenance packets. Therefore, in the apparatus and the method disclosed above, the discard of the maintenance packets which otherwise might affect other users may be positively prevented from affecting the other users without imposing any burden on the buffer, etc. arranged in the front stage of the controller as well as on the controller even when the maintenance packets are received at an abnormally high rate or in a great amount.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

The invention claimed is:
1. A packet transmission apparatus comprising:
a user identification circuit that identifies a user of an input user flow upon input of the user flow containing communication packets and maintenance packets;

a maintenance packet extraction circuit that extracts the maintenance packets from the user flow of the user identified by the user identification circuit;

a maintenance packet output controller that controls a transparent output of the maintenance packets extracted by the maintenance packet extraction circuit based on a set monitor rate;

a processor that monitors and controls the user flow of the particular user based on the maintenance packets of the user transparently output by the maintenance packet output controller; and a monitor rate management memory that stores the monitor rate for monitor rate identification information to identify the monitor rate;

a user management memory that stores the monitor rate identification information for each user; and a monitor rate setting memory that reads, upon identification of the user of the user flow by the user identification circuit, the monitor rate identification information corresponding to the identified user from the user management memory, reads the monitor rate corresponding to the read monitor rate identification information from the monitor rate management memory, and sets the read monitor rate in the maintenance packet output controller, and wherein the maintenance packet output controller controls the transparent output of the maintenance packets for the user extracted by the maintenance packet extraction circuit, based on the monitor rate for the user set by the monitor rate setting circuit.

2. The packet transmission apparatus according to claim 1, wherein the setting of the monitor rate identification information and the monitor rate stored by the monitor rate management memory, and the setting of the user and the monitor rate identification information managed by the user management memory are changeable.

3. The packet transmission apparatus according to claim 1, further comprising:

a monitor rate management memory that stores the monitor rate for monitor rate identification information to identify the monitor rate;

a user maintenance type management memory that stores the monitor rate identification information for each maintenance content type of the maintenance packets related to the user; and a monitor rate setting circuit that reads, upon identification of the user of the user flow by the user identification circuit, the monitor rate identification information for each maintenance content type of the maintenance packets for the identified user from the user maintenance type management memory, reads the monitor rate corresponding to the monitor rate identification information for each read maintenance content type from the monitor rate management memory, and sets the monitor rate for each read maintenance content type in the maintenance packet output controller, wherein the maintenance packet output controller controls the transparent output for each maintenance content type of the maintenance packets for the user extracted by the maintenance packet extraction circuit, based on the monitor rate for each maintenance content type of the user set by the monitor rate setting circuit.

4. The packet transmission apparatus according to claim 3, wherein the setting of the monitor rate identification information and the monitor rate stored by the monitor rate management memory and the maintenance content type, and the setting of the monitor rate identification information for the maintenance packets for the user managed by the user maintenance type management memory are changeable.

5. The packet transmission apparatus according to claim 1, further comprising:

a monitor rate management memory that stores the monitor rate for each monitor rate identification information to identify the monitor rate;

a user maintenance type management memory that stores the monitor rate identification information for each maintenance content type of the maintenance packets related to the user;

a user management memory that stores the monitor rate identification information and operation flag information indicating whether the monitor rate identification information for each maintenance content type is to be used or not;

a flag judgment circuit that reads, upon identification of the user of the user flow by the user identification circuit, the operation flag information corresponding to the identified user from the user management memory, and judges, based on the read operation flag information, whether the monitor rate identification information for each maintenance content type is used or not; and a monitor rate setting circuit that reads, upon judgment by the flag judgment circuit that the monitor rate identification information for each maintenance content type is not used, the monitor rate identification information corresponding to the identified user from the user management memory, reads the monitor rate corresponding to the read monitor rate identification information from the monitor rate management memory, and sets the read monitor rate in the maintenance packet output controller, wherein the maintenance packet output controller controls the transparent output of the maintenance packets for the user extracted by the maintenance packet extraction circuit based on the monitor rate of the user set by the monitor rate setting circuit, the monitor rate setting circuit reads, upon judgment by the flag judgment circuit that the monitor rate identification information for each maintenance content type is used, the monitor rate identification information for each maintenance content type of the maintenance packets for the identified user from the user maintenance type management memory, reads the read monitor rate identification information for each maintenance content type from the monitor rate management memory, and sets the read monitor rate for each maintenance content type in the maintenance packet output controller, and the maintenance packet output controller controls the transparent output for each maintenance content type of the maintenance packets for the user extracted by the maintenance packet extraction circuit based on the monitor rate for each maintenance content type of the user set by the monitor rate setting circuit.

6. The packet transmission apparatus according to claim 5, wherein the setting of the monitor rate identification information and the monitor rate stored by the monitor rate management memory, the setting of the monitor rate identification information and the maintenance content type of the maintenance packets for the user stored by the user maintenance type management memory, and the setting of the user, the monitor rate identification information, and the operation flag information stored by the user management memory are changeable.

7. The packet transmission apparatus according to claim 1, wherein the maintenance packet output controller, based on the monitor rate set by the monitor rate setting circuit, discards the user maintenance packets exceeding the monitor rate setting, and transparently outputs the user maintenance packets not exceeding the monitor rate setting.

8. The packet transmission apparatus according to claim 7, wherein the maintenance packet output controller employs a single token bucket scheme.

9. The packet transmission apparatus according to claim 7, wherein the maintenance packet output controller includes a discarded number counter for counting the number of the maintenance packets discarded.

10. The packet transmission apparatus according to claim 1, wherein the monitor rate setting circuit rejects setting the monitor rate read from the monitor rate management memory when the read monitor rate exceeds a tolerable rate of the processor, and sets the monitor rate read from the monitor rate management memory when the read monitor rate does not exceed the tolerable rate of the processor.

11. The packet transmission apparatus according to claim 1, wherein the monitor rate management memory stores the maintenance packet monitor rate which is lower than the communication packet monitor rate.

12. The packet transmission apparatus according to claim 1, further comprising:
a communication packet extraction circuit for extracting the communication packets from the user flow of the user identified by the user identification circuit; and
a communication packet output controller for controlling the transparent output of the communication packets extracted by the communication packet extraction circuit based on the monitor rate setting.

13. The packet transmission apparatus according to claim 1, further comprising:
a monitor rate management memory that stores the monitor rate for monitor rate identification information to identify the monitor rate;
a user maintenance type management memory that stores the monitor rate identification information for each maintenance content type of the maintenance packet for the user;
a user management memory that stores the monitor rate identification information and the operation flag information indicating whether the monitor rate identification information for each maintenance content type is to be used or not;
a flag judgment circuit that reads, upon identification of the user of the user flow by the user identification circuit, the operation flag information corresponding to the identified user from the user management memory, and judges, based on the operation flag information thus read, whether the monitor rate identification information for each maintenance content type is used or not; and
a monitor rate setting circuit for reading, upon judgment by the flag judgment circuit that the monitor rate identification information for each maintenance content type is not used, the monitor rate identification information for each maintenance content type of the maintenance packets for the identified user from the user maintenance type management memory, reading the monitor rate corresponding to the read monitor rate identification information for each maintenance content type from the monitor rate management memory, and setting the read monitor rate for each maintenance content type in the maintenance packet output controller,
wherein, the maintenance packet output controller controls the transparent output for each maintenance content type of the maintenance packets for the user extracted by the maintenance packet extraction circuit based on the monitor rate for each maintenance content type of the user set by the monitor rate setting circuit,
the monitor rate setting circuit reads, upon judgment by the flag judgment circuit that the monitor rate identification information for each maintenance content type is used, reads the monitor rate identification information for each maintenance content type of the maintenance packets for the identified user from the user maintenance type management memory, the monitor rate corresponding to the read monitor rate identification information for each maintenance content type from the monitor rate management memory, and sets the read monitor rate for each maintenance content type in the maintenance packet output controller, and
the maintenance packet output controller controls the transparent output for each maintenance content type of the maintenance packets for the user extracted by the maintenance packet extraction circuit based on the monitor rate for each maintenance content type of the user set by the monitor rate setting circuit.

14. A packet transmission method comprising:
identifying a user of an input user flow upon input of the user flow containing communication packets and maintenance packets;
extracting the maintenance packets from the user flow of the identified user;
a controlling a transparent output of the extracted maintenance packets based on a set monitor rate;
monitoring and controlling the user flow of the particular user based on the maintenance packets of the user transparently output;
preparing a monitor rate management memory to store the monitor rate for monitor rate identification information for identifying the monitor rate;
preparing a user management memory to store the monitor rate identification information for each user;
reading, upon identification of the user of the user flow, the monitor rate identification information corresponding to the identified user from the user management memory, reading the monitor rate corresponding to the read monitor rate identification information from the monitor rate management memory, and setting the read monitor rate, and
wherein controlling the transparent output of the maintenance packets includes controlling the transparent output of the extracted maintenance packets related to the user based on the set monitor rate of the user based on the monitor rate of the user.

15. The packet transmission method according to claim 14, further comprising:
preparing the monitor rate management memory to store the monitor rate for monitor rate identification information for identifying the monitor rate;
preparing the user maintenance type management memory to store the monitor rate identification information for each maintenance content type of the maintenance packets related to the user; and
reading, upon identification of the user of the user flow, the monitor rate identification information for each maintenance content type of the maintenance packets for the identified user from the user maintenance type management memory, reading the monitor rate corresponding to the read monitor rate identification information for the maintenance content type from the monitor rate management memory, and setting the read monitor rate for each maintenance content type for controlling output of the maintenance packet, and wherein, controlling transparent output of the maintenance packet includes controlling the transparent output for each maintenance content type of the extracted maintenance packets related to the user based on the monitor rate for each maintenance content type of the user set.

16. The packet transmission method according to claim 14, further comprising:

preparing the monitor rate management memory to store the monitor rate for monitor rate identification information for identifying the monitor rate;

preparing the user maintenance type management memory to store the monitor rate identification information for each maintenance content type of the maintenance packets related to the user;

preparing the user management memory to store the monitor rate identification information and operation flag information indicating whether the monitor rate identification information for each maintenance content type is to be used or not for each user;

reading, upon identification of the user of the user flow, the operation flag information corresponding to the identified user from the user management memory and based on the read operation flag information, and judging whether the monitor rate identification information for each maintenance content type is used or not; and a reading, when judging that the monitor rate identification information for each maintenance content type is not used, the monitor rate identification information corresponding to the identified user from the user management memory, reading the monitor rate corresponding to the read monitor rate identification information from the monitor rate management memory, and setting the read monitor rate for controlling transparent output of the maintenance packet, wherein, controlling transparent output of the maintenance packet includes controlling the transparent output of the extracted maintenance packets for the user based on the monitor rate of the user, setting the monitor rate includes reading, upon judgment that the monitor rate identification information for each maintenance content type is used, the monitor rate identification information for each maintenance content type of the maintenance packets for the identified user from the user maintenance type management memory, reads the read monitor rate identification information for each maintenance content type from the monitor rate management memory, and sets the read monitor rate for each maintenance content type for controlling output of the maintenance packet, and controlling transparent output of the maintenance packet includes controlling the transparent output for each maintenance content type of the extracted maintenance packets related to the user based on the set monitor rate for each maintenance content type of the user.

* * * * *

UNITED STATES PATENT AND TRADEMARK OFFICE
CERTIFICATE OF CORRECTION

PATENT NO. : 8,089,876 B2  
APPLICATION NO. : 12/554214  
DATED : January 3, 2012  
INVENTOR(S) : Yuichiro Katsura et al.

Page 1 of 1

It is certified that error appears in the above-identified patent and that said Letters Patent is hereby corrected as shown below:

Column 22, Line 34, In Claim 14, before "controlling" delete "a".

Column 24, Line 1, In Claim 16, before "reading" delete "a".

Signed and Sealed this  
Twenty-fourth Day of April, 2012

David J. Kappos  
*Director of the United States Patent and Trademark Office*